US006260814B1

(12) United States Patent
Mathews

(10) Patent No.: US 6,260,814 B1
(45) Date of Patent: Jul. 17, 2001

(54) NOISE INSULATING MOUNTING BRACKET FOR AN AUTOMOBILE ON-BOARD AIR COMPRESSOR

(75) Inventor: Dale J. Mathews, Lenoir, NC (US)

(73) Assignee: Cambridge Industries, Inc., Madison Heights, MI (US)

( * ) Notice: Subject to any disclaimer, the term of this patent is extended or adjusted under 35 U.S.C. 154(b) by 0 days.

(21) Appl. No.: 09/060,896

(22) Filed: Apr. 15, 1998

(51) Int. Cl.[7] ............................................. F16M 13/00
(52) U.S. Cl. .......................... 248/634; 248/674; 248/678
(58) Field of Search .................................. 248/634, 903, 248/610, 632, 633, 635, 638, 674, 678, 675; 280/6.157, 124.157; 417/278

(56) References Cited

U.S. PATENT DOCUMENTS

| 4,946,351 | * | 8/1990 | Richradson, Jr. | 248/638 X |
| 5,201,624 | * | 4/1993 | Ecktman | 411/180 |
| 5,222,850 | * | 6/1993 | Medal | 411/180 X |
| 5,484,162 | * | 1/1996 | Kanoh et al. | 280/6.157 |
| 5,524,860 | * | 6/1996 | Ives | 248/674 |

* cited by examiner

Primary Examiner—Anita M. King
Assistant Examiner—Naschica Sanders
(74) Attorney, Agent, or Firm—Van Dyke, Gardner, Linn & Burkhart, LLP

(57) ABSTRACT

An air compressor 10 for an air leveling suspension system of a motor vehicle is mounted on a vibration reducing bracket 12. The bracket includes a bottom panel section 16 that has a perforated metal grid 40 embedded therein. Side walls 18 extend to an open top 20. A first set of brass inserts 24 are embedded into a plurality of tiers 22 that are spaced between the closed bottom panel section 16 and open top 20 to mount the air compressor 10. A second set of brass inserts receive bolts 31 to mount the bracket to the chassis 14 of a motor vehicle.

7 Claims, 3 Drawing Sheets

NOISE INSULATING MOUNTING BRACKET FOR AN AUTOMOBILE ON-BOARD AIR COMPRESSOR

TECHNICAL FIELD

The field of this invention relates sound insulating brackets for automotive components.

BACKGROUND OF THE DISCLOSURE

Automobiles have seen vast improvements in ride comfort. Part of the comfort is due to improved noise insulation from undesirable road noises and operating parts of the automobile. It is becoming more common for automobiles to have active suspensions. Some of these active suspensions have air springs or air leveling systems that sense the height position of the automobile body and will raise, lower, and level the body. When air is needed to be pumped into the appropriate air spring, an air compressor is activated.

However, the operation of an air compressor can be noisy. The noise and the accompanying vibrations need to be insulated from the automobile body.

The air compressor has been mounted not directly to the body but has been mounted to a bracket which in turn is attached to the automobile body. However, previous brackets have been made from metal and transferred too much noise to the automobile body.

What is needed is an improved composite bracket for mounting an air compressor to an automobile body that insulates vibration and noise of the compressor from the automobile body while still providing the necessary structural strength to support the air compressor.

SUMMARY OF THE DISCLOSURE

In accordance with one aspect of the invention, a mounting bracket for mounting a vibrating component to a motor vehicle body includes a three dimensional body formed of plastic material. The body has an open top end for receiving a component such as an air compressor for an air leveling system. The body also has a closed bottom panel section for enclosing the air compressor under the main body of the motor vehicle. The bracket also has a plurality of side walls extending from the closed bottom panel section, and at least one tier interposed between the closed bottom panel and open top substantially the entire footprint of the bracket and from a closed downwardly facing wall section for protection against splashing of water and mud. A first set of mountings within the at least one tier is used to connect the air compressor components to the three dimensional body. A second set of mountings within body is used to connect the mounting bracket to the motor vehicle body. The first and second sets of mountings are spaced different distances with respect to the closed bottom panel section.

Preferably the first set of mountings includes metal inserts securely embedded within the at least one tier and having threaded aperture for connection with the component. It is also desirable that the second set of mountings includes at least one metal bushing pressed fitted in an aperture in the plastic body. Preferably the metal bushing is pressed fitted in said closed bottom panel section of the plastic body.

Preferably a perforated metal grid is embedded in the closed bottom end panel section of the plastic body. It is desirable that the plastic body and perforated metal grid are shaped and molded together by a compression mold in a single step in a compression mold set of dies such that the perforated metal grid conforms to the shape of the closed bottom end panel section.

In this fashion, a bracket nestingly mounts a vibrating air leveling components such as an air compressor to a motor vehicle body and insulates much of the vibration and noise from the air compressor to the vehicle body while still maintaining the structural strength necessary to support the vibrating components.

BRIEF DESCRIPTION OF THE DRAWINGS

Reference now is made to the accompanying drawings in which.

DETAILED DESCRIPTION OF THE PREFERRED EMBODIMENT

Figure 1:
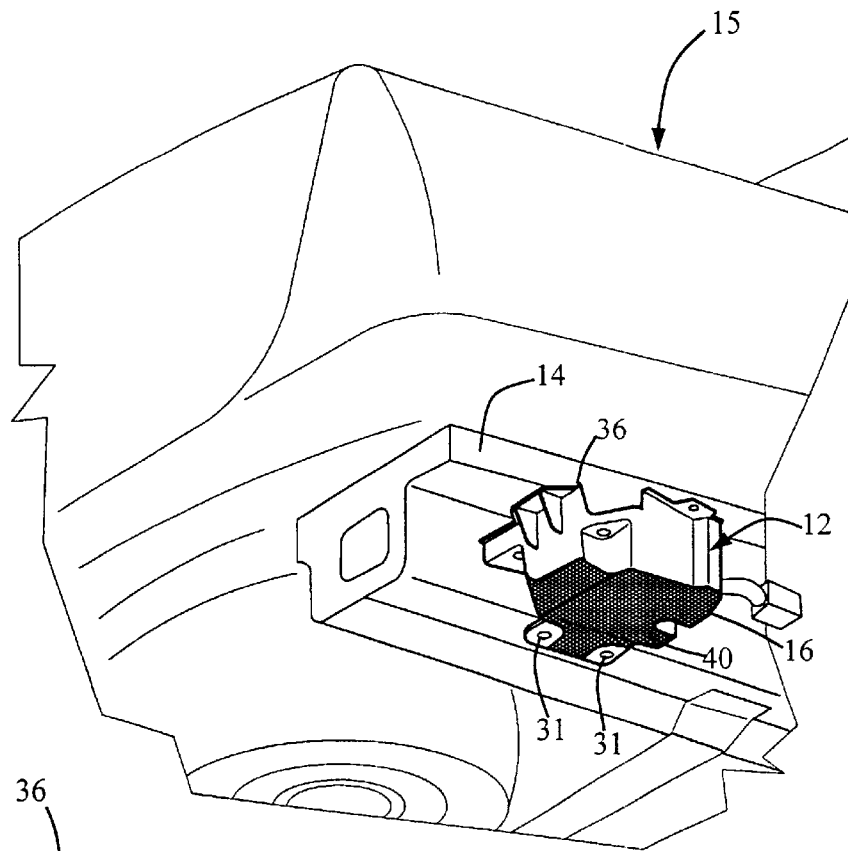
FIG. 1 is a bottom perspective view of a mounting bracket for an air compressor installed in the chassis of a motor vehicle.
Figure 2:
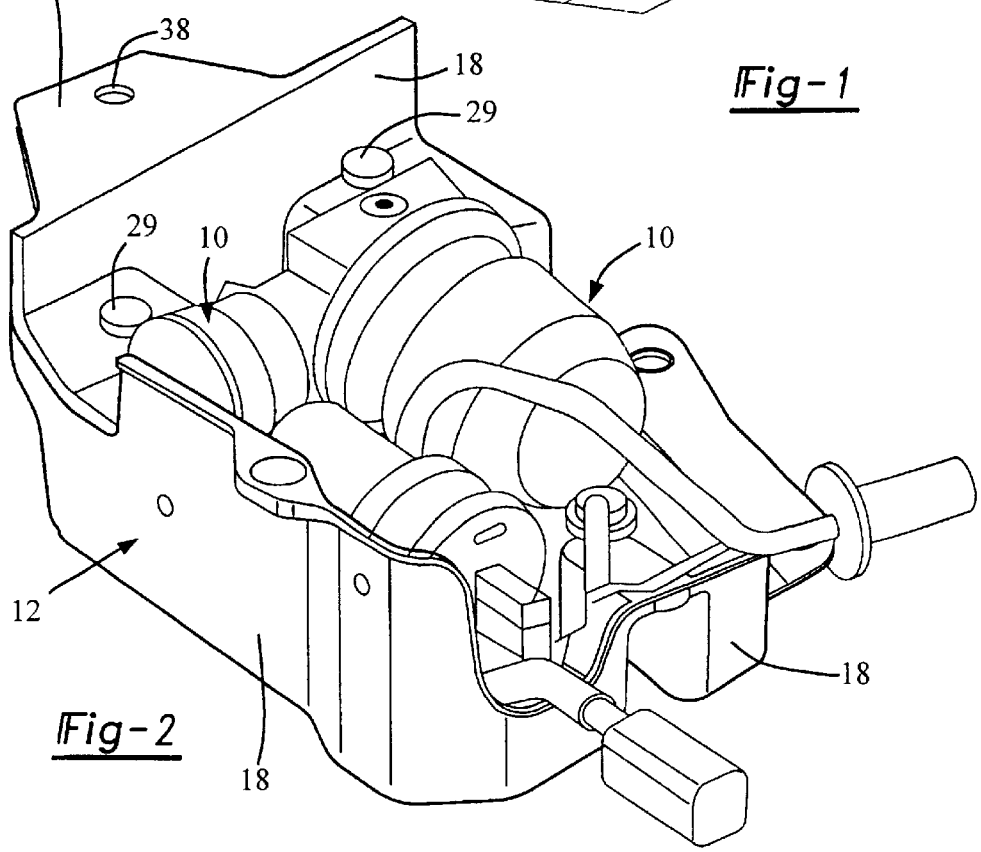
FIG. 2 is a top perspective view of the mounting bracket illustrating the nesting of the air compressor therein.

Referring now to FIGS. 1 and 2, air suspension leveling components 10 such as an air compressor are nestingly mounted to a bracket 12. The bracket 12 in turn is mounted to the chassis 14 (or under body) of a motor vehicle 15.

Figure 3:
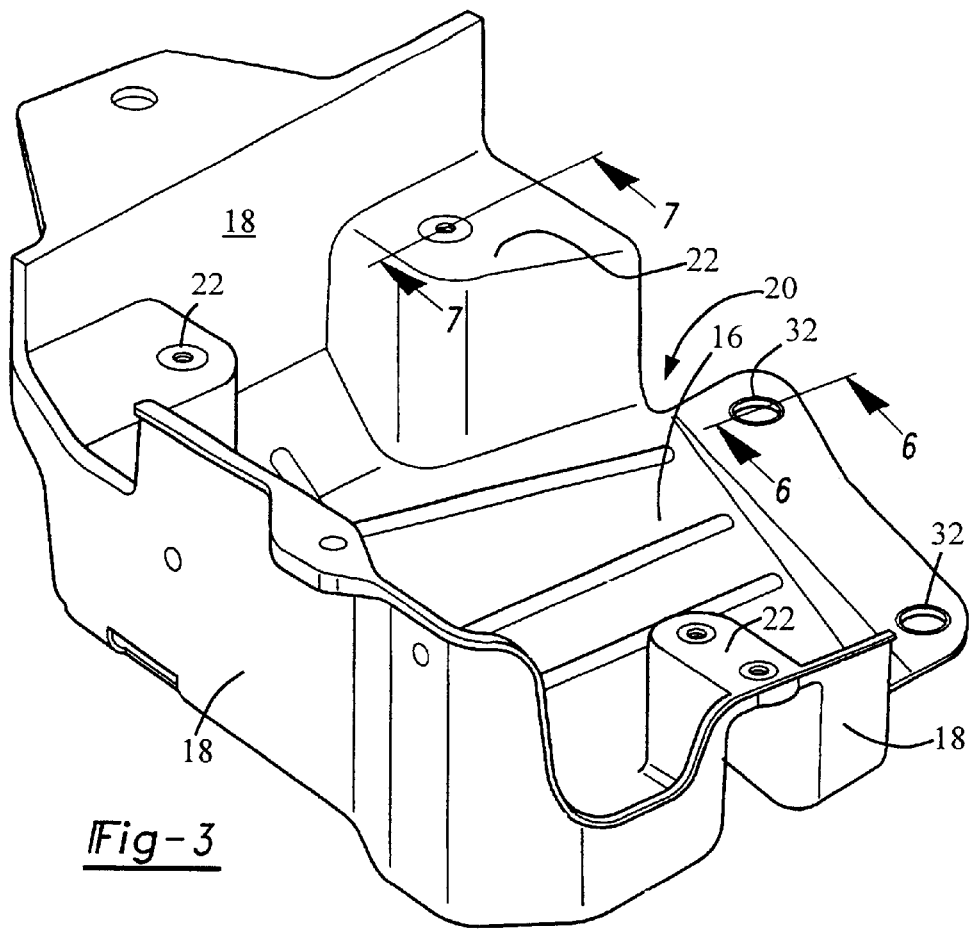
FIG. 3 is top perspective view of the mounting bracket shown in FIG. 1.
Figure 4:
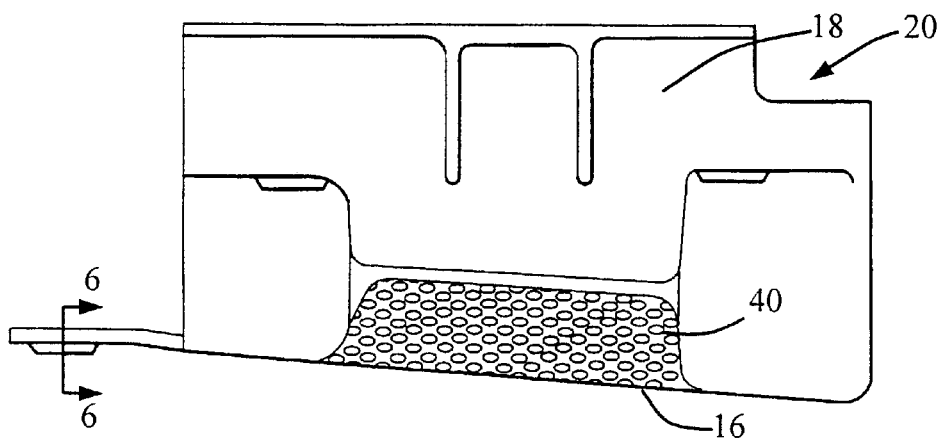
FIG. 4 is rear elevational view of the bracket shown in FIG. 1.
Figure 5:
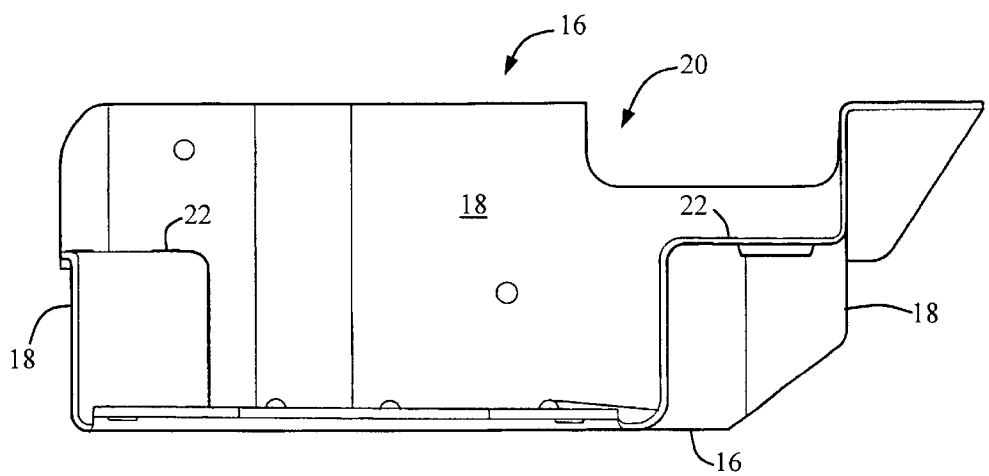
FIG. 5 is a side, elevational view of the bracket shown in FIG. 1.
Figure 7:
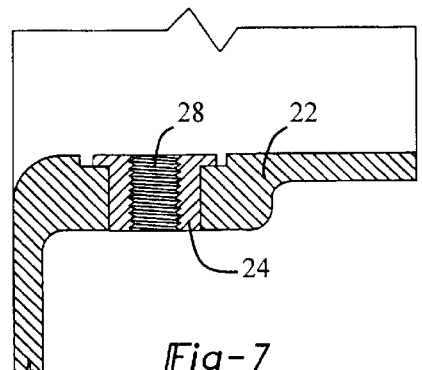
FIG. 7 is an enlarge cross-sectional view taken along line 7—7 shown in FIG. 3.

The bracket 12 as more clearly shown in FIGS. 3–5 has a bottom panel section 16, side walls 18, a rear top section 20 and a plurality of tiers 22. Each tier 22 has a brass mount insert 24 embedded in the plastic tier 22. The tiers 22 are coplanar and spaced vertically higher from the bottom panel section 16. Each brass mount insert 24 as more clearly shown in FIG. 7 has a threaded aperture 28 that receives a shouldered threaded bolt 29 that mounts the air suspension leveling components 10 to the bracket 12 as shown in FIG. 2. The shouldered bolts may be further cushioned via elastomeric grommets or bushings (not shown).

Figure 6:
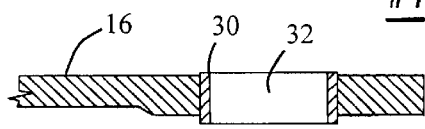
FIG. 6 is an enlarged cross-sectional view taken along line 6—6 shown in FIG. 3.
Figure 8:
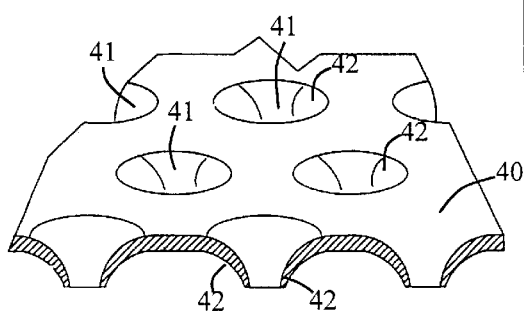
FIG. 8 is an enlarged fragmentary and partially segmented view of the perforated metal grid that is embedded in the mounting bracket.
Figure 9:
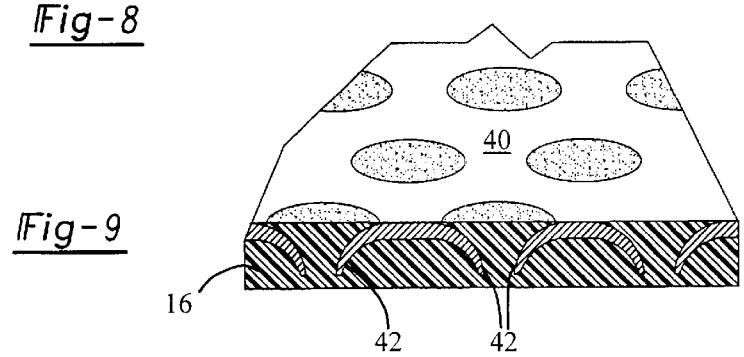
FIG. 9 is an enlarged fragmentary and partially segmented view of the metal grid shown embedded in the mounting bracket.

Two brass inserts 30 are press fitted into two apertures 32 in the bottom panel section 16 as more clearly shown in FIG. 6. These brass inserts 30 receive mounting studs 31 that bolt into the chassis 14 as shown in FIG. 1. Another mount 36 is at the rear end and includes an aperture 38 to similarly receive a another bolt 31 that mounts to the chassis. The mounting studs may further use elastomeric bushings or grommets (not shown). The bottom panel section includes an embedded perforated metal grid 40. The grid 40 as shown in FIG. 8 is perforated to have a plurality of apertures 41 with the surrounding flanged metal forming anchor flanges 42 facing into the plastic of the bottom panel section as shown in FIG. 9.

The bracket 12 is formed through a molding process. The metal grid 40 is placed in a die form and the sheet of plastic material is placed on top. The die is then closed and the plastic and grid are formed into the appropriate shape in a single compression molding step with the grid 40 conforming to the shape of the bottom panel section 16.

In this fashion, the brass mount inserts 24 by being vertically spaced from the bottom panel section 16 provides for vibration insulation and dampening through the plastic material. In this way when an air compressor is activated, the amount of vibration carried or transferred to the chassis 14 is reduced. The air suspension leveling components 10 are securely nested in the bracket 12 and mounted thereto. The bracket 12 in turn is mounted to the chassis 14 of the motor vehicle.

Variations and modifications are possible without departing from the scope and spirit of the present invention as defined by the appended claims.

The embodiments in which an exclusive property or privilege is claimed are defined as follows:

1. A mounting bracket for mounting a vibrating component to a motor vehicle body, said bracket characterized by;
    a three dimensional body formed of plastic material, said three dimensional body having an open top end for receiving said component, a closed downwardly facing bottom panel section, a plurality of side walls extending from said closed bottom panel section, and at least one tier interposed between said bottom panel section and open top end; said bottom panel and said at least one tier substantially spanning an entire footprint of the body to form a substantially closed downwardly facing wall for securely protecting said component.
    a first set of mountings within said plastic body at said at least one tier for connecting the component to the three dimensional body;
    a second set of mountings within said plastic body for connecting the mounting bracket to the motor vehicle body;
    said first set of mountings being spaced different distances from said closed bottom panel section than the second set of mountings.

2. A mounting bracket as defined in claim 1 further characterized by:
    said first set of mountings including metal inserts securely embedded within said plastic body at said at least one tier and having a threaded aperture for connection with the component.

3. A mounting bracket as defined in claim 2 further characterized by:
    said plastic body having a perforated metal grid embedded in the closed bottom panel section.

4. A mounting bracket as defined in claim 2 further characterized by:
    said second set of mountings including at least one metal bushing pressed fitted in an aperture in said plastic body.

5. A mounting bracket as defined in claim 4 further characterized by:
    said metal bushing being pressed fitted in said closed bottom panel section of said plastic body.

6. A mounting bracket as defined in claim 1 further characterized by:
    said plastic body having a perforated metal grid embedded in the closed bottom panel section.

7. A mounting bracket as defined in claim 3 further characterized by:
    said plastic body and perforated metal grid being shaped and together by a compression mold in a single step in a compression mold set of dies such that said perforated metal grid conforms to the shape of the closed bottom panel section.

* * * * *